United States Patent [19]
Gelbart

[11] Patent Number: 6,137,580
[45] Date of Patent: Oct. 24, 2000

[54] AUTOFOCUS SYSTEM

[75] Inventor: Daniel Gelbart, Vancouver, Canada

[73] Assignee: Creo SRL, Burnaby, Canada

[21] Appl. No.: 09/158,800

[22] Filed: Sep. 22, 1998

[51] Int. Cl.[7] .......................... G01B 11/00; G01N 21/00; G01J 1/20; G02B 7/04

[52] U.S. Cl. ...................... 356/401; 356/400; 356/237.5; 250/237 G; 250/201.1; 250/201.5; 250/201

[58] Field of Search ............................... 356/401, 237.5, 356/400, 372, 376, 388, 396, 399; 250/201, 201.1, 201.2, 237 G

[56] References Cited

U.S. PATENT DOCUMENTS

| | | | |
|---|---|---|---|
| 4,733,065 | 3/1988 | Hoshi et al. | 250/201 |
| 5,122,660 | 6/1992 | Yoshii et al. | 250/237 G |

*Primary Examiner*—Frank G. Font
*Assistant Examiner*—Roy M. Punnoose
*Attorney, Agent, or Firm*—Oyen Wiggs Green & Mutala

[57] ABSTRACT

A method and apparatus for an improved autofocus in an optical system is presented. The improved autofocus system uses distinct optics from those of the primary optical system. Although optically distinct, physically, the autofocus optics are mechanically linked to the optical output stage of the primary optical system. The optical separation of the autofocus optics from those of the primary optical system overcomes the trade-offs associated with trying to combine the primary optical function and focus in the same beam. In particular, the autofocus beam is not blinded by a more powerful write beam. The physical integration of the autofocusing optics with the optical output stage of the primary optical system overcomes the difficulties associated with using external distance sensors. In particular, the autofocusing system is not susceptible to steady state error because the autofocus sensor is a true null detector.

18 Claims, 2 Drawing Sheets ial device.

AUTOFOCUS SYSTEM

FIELD OF THE INVENTION

The invention herein disclosed involves an improved technique for autofocusing a primary optical system, so as to effectively read and write on an object surface. Specifically, the invention involves an autofocusing system with a null controlling distance sensor that uses optics which are optically distinct yet mechanically coupled to those of the primary optical device.

BACKGROUND OF THE INVENTION

Prior art in autofocusing principally relies on two techniques. These two techniques and their associated drawbacks will be discussed below.

The most common prior art method of autofocusing an optical system employs the same optics for both the imaging system and the autofocusing system. This type of autofocusing system, typically used in compact disc technology, is depicted in FIG. 1.

The imaging system in its simplest form is a laser diode 4 imaged onto material 3 by lens 1. Lens 1 can be moved by focus actuator 6, typically a coil moving in a magnetic field. Some of the light reflected back from the material 3 is diverted towards the focus detector 5 by an optical element 2, typically a diffraction grating or a partial mirror. As the distance between lens 1 and material 3 changes, a corresponding change is sensed by detector 5, driving actuator 6 via amplifier 7 to null the error out. This is the well known null detector type of focus servo. The principal disadvantage with this system is that the optical imaging system is shared by the main beam and the focus beam, requiring compromises, particularly when laser 4 is used for writing. In this type of autofocus system, the light output of laser 4 is data dependent, making accurate determination of the focus error difficult. This data dependence usually requires a separate, low power, laser diode for focusing. The high power of the write laser can also blind the focus detector, which is attempting to measure the reflected low power beam.

A second prior art autofocus method is depicted in FIG. 2. In this method, a separate distance sensor 8 is used to control actuator 6 in order to keep the distance between lens 1 and material 3 constant. The main drawback with this system is that the control is essentially open loop. Any errors or changes in the position of lens 1 are not sensed by the separate distance sensor 8. Further, if the clearance between sensor 8 and material 3 is large, it is difficult to achieve the required resolution and stability. The system of FIG. 2 does not null out the focus error, it simply moves the lens 1 to the calculated position without any information about whether or not the system is in focus.

Accordingly, it is an object of the present invention to overcome the drawbacks of the prior art by providing a method and apparatus for a null detecting autofocus system.

Another object of the present invention is to employ the autofocusing technique in an optical system wherein the optics used for the autofocus are distinct from those of the primary optical system, so as to eliminate the tradeoffs between focus beams requiring low power and write beams requiring high power which can blind the focus detector.

SUMMARY OF THE INVENTION

The invention herein disclosed concerns an apparatus for maintaining a desired separation distance between an object and the optical output stage of a primary optical system. The optical output stage can be a single lens or a complex optical system containing many elements. The apparatus comprises: a laser source operative to generate an incident beam and a pair of optical elements rigidly attached to either side of the optical output stage. The first of the pair of optical elements is operative to deflect the incident beam on its way towards the object. The incident beam is reflected by the object becoming the reflected beam. The second of the pair of optical elements is operative to deflect the reflected beam.

The apparatus also includes a position sensitive detector (PSD), which is operative to receive the reflected beam on an input surface thereof and to provide an output signal representative of the location of the reflected beam on its input surface. The location of the reflected beam on the input surface of the PSD is representative of the actual separation between the object and the optical output stage of the primary optical system. The apparatus also contains a control loop which interprets the signal produced by the position sensitive detector and outputs a corresponding control signal. The control signal is calculated in a manner so as to zero the difference between the desired separation and the actual separation, as measured by the PSD, of the object and the optical output stage. Finally, the apparatus includes an output stage positioner operative to receive the control signal from the control loop and to move the optical output stage in proportion to the control signal so as to maintain the desired separation between the object and the optical output stage.

Advantageously, the apparatus may contain an additional optical element, which can be used to focus the reflected beam onto the position sensitive detector, thereby increasing the resolution the detector. The additional optical element may be reflective, diffractive or refractive. The pair of optical elements coupled to the optical output stage may also be reflective, diffractive or refractive. Preferably, the pair of optical elements is a pair of mirrors.

The apparatus may also include a collimating lens disposed in the path of the incident beam between the laser source and the first of the pair of optical elements.

Advantageously, the apparatus may further comprise an optical filter disposed in the path of the reflected beam. The optical filter may attenuate light of a wavelength other than that of the reflected beam. In particular, the optical filter will reject light from the primary optical system.

The control loop may include a digital signal processing (DSP) micro-controller.

The output stage positioner may be of several different types, including: a moving coil actuator, a moving iron actuator, a moving magnet actuator, a piezoelectric actuator and a magnetostrictive actuator.

A second aspect of this invention involves a method for maintaining a desired separation distance between an object and an optical output stage of a primary optical system. The method comprises the following steps:

(a) generating an incident laser beam from a laser source;

(b) deflecting the incident beam with a first optical element, which is rigidly attached to the optical output stage, after being deflected the incident beam proceeds to strike the object and reflect off of it, becoming a reflected beam. The ensuing steps of the autofocusing method comprise:

(c) deflecting the reflected beam with a second optical element, which is rigidly attached to the optical output stage;

(d) measuring a location of the reflected beam when it impinges on the input surface of a position sensitive detector.

Because of the configuration of the first and second optical elements, the location of the reflected beam on the input surface of the position sensitive detector is representative of the actual separation between the object and the optical output stage of the primary optical system. The subsequent steps in the autofocusing system comprise:

(e) calculating a feedback signal based on both the desired separation and the actual separation, as determined in the measuring step, between the object and the optical output stage of the primary optical system;

The feedback signal is calculated in such a manner as to zero the difference between the desired separation and the actual separation, as determined by the measurement step, of the object and the optical output stage. Finally, the autofocusing method includes the step of:

(f) using the feedback signal to control an output stage positioner;

The output stage positioner is operative to move the optical output stage in proportion to the feedback signal, so as to maintain the desired separation between the object and the optical output stage.

Advantageously, the first and second deflecting steps may be accomplished with optical elements which are reflective, diffractive or refractive. Preferably, the first and second deflecting steps are accomplished with mirrors.

The autofocusing method may further comprise the step of focusing the reflected beam onto the input surface of the position sensitive detector. The focusing step may occur between the second deflecting step (c) and the measuring step (d). The focusing step may be operative to narrow the spot size of the reflected beam on the input surface of the position sensitive detector, so as to improve the accuracy of the measuring step. Preferably, the focusing step is accomplished by an additional optical element, which is reflective, refractive or diffractive.

The autofocusing method may further comprise the step of collimating the incident beam before it is deflected. The collimating step may occur between the generating step (a) and the first deflecting step (b).

The autofocusing method may further comprise the step of filtering the reflected beam. The filtering step may be operative to attenuate light of a wavelength other than that of the reflected beam. In particular, the filtering step may reject any light originating from the primary optical system.

Advantageously, the calculating step may be accomplished by a digital signal processing (DSP) microcontroller.

Preferably the output stage positioner may be a moving coil actuator, a moving iron actuator, a moving magnet actuator, a piezoelectric actuator or a magnetostrictive actuator.

DESCRIPTION OF THE PREFERRED EMBODIMENT

Figure 1:
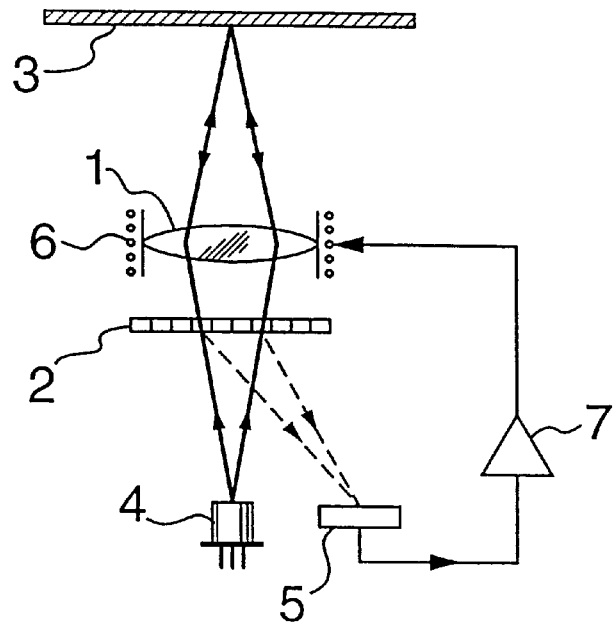
FIG. 1 depicts the first type of prior art autofocusing system, wherein the focusing beam employs the same optics as the primary optical system.
Figure 2:
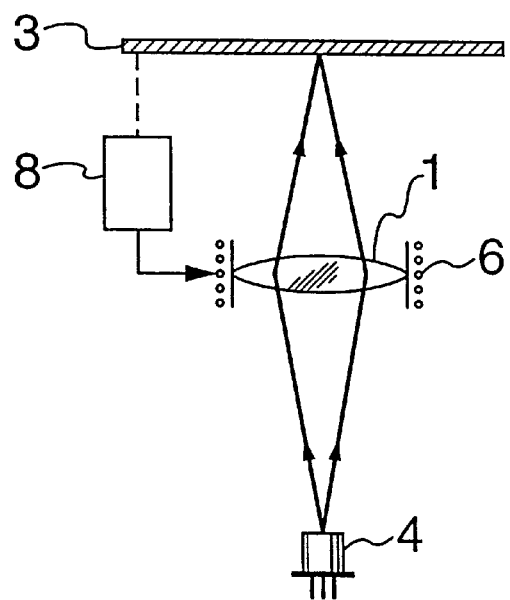
FIG. 2 depicts the second type of prior art autofocusing system, wherein an external distance sensor is employed to feedback distance measurements to the lens positioner.
Figure 3:
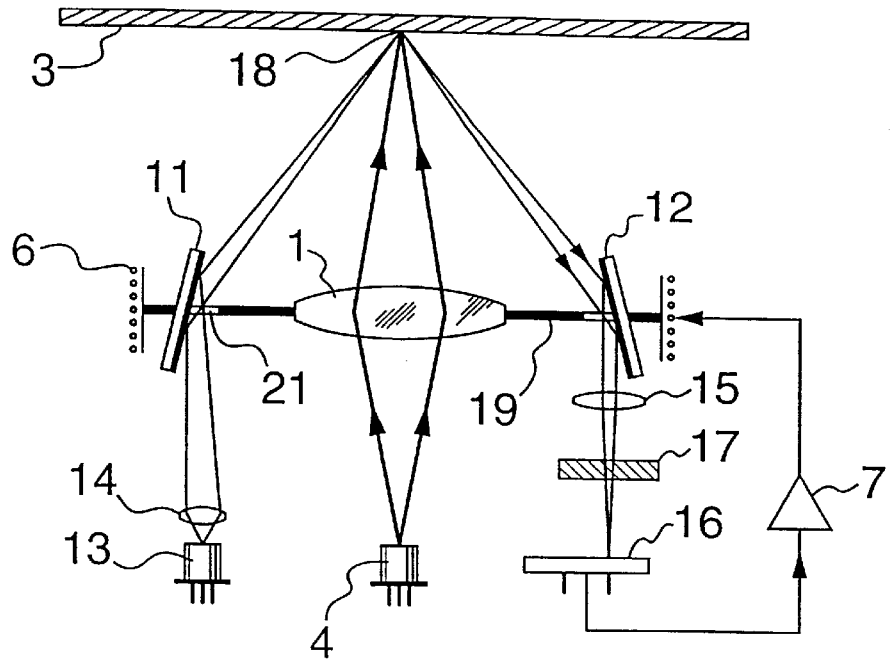
FIG. 3 depicts the present invention used for autofocusing the primary optical system by employing a pair of optical elements rigidly attached to the output stage of the primary optical system.
Figure 4:
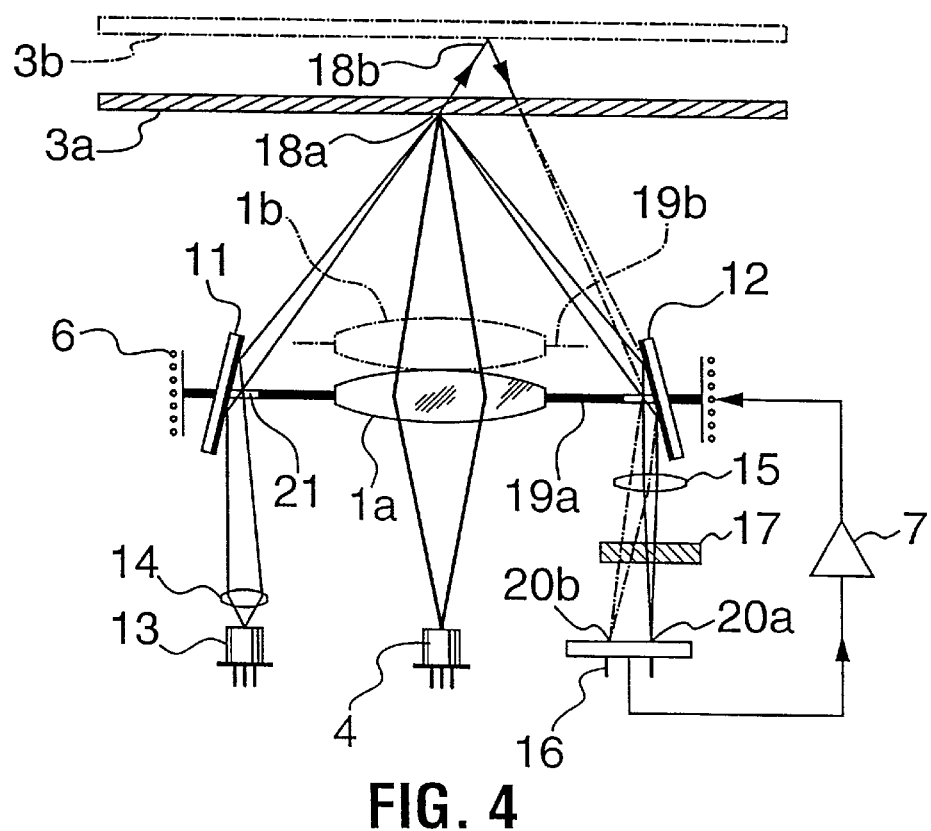
FIG. 4 depicts the functionality of the present invention and how it can be used to overcome a change in the position of the scanned material.

With reference to FIGS. 3 and 4 the autofocusing system embodying the principles and concepts of the present invention is hereinafter described.

Referring now to FIG. 3, the autofocus system according to the present invention is depicted. The primary optical system includes the primary laser 4, the optical output stage (represented by lens 1) and the material 3. The autofocusing system includes the two mirrors 11 and 12, which are rigidly affixed to lens 1 by rigid member 19 having openings 21 to allow the passage of the light beams. Also included in the autofocusing system are the secondary laser source 13, the collimating lens 14, the output stage positioner 6, the amplifier and feedback loop 7, the secondary focusing lens 15, the optical filter 17, and the position sensitive detector 16. Positioner 6, often referred to as an actuator, is coupled to lens 1 and mirrors 11 and 12 using rigid member 19. Elements 1, 6, 11, and 12 move together as a single optical assembly.

Referring to FIG. 4, the operation of the autofocus system according to the present invention is described. Assuming that the optical system is originally focused, the position of lens 1 is shown as 1a. Laser 4 shines through the optical system, which focuses the beam at the point 18a on the material surface 3a. The secondary laser source 13 shines through the collimating lens 14, reflects off of the first mirror 11, off of the read/write surface 3a at point 18a and then off of the second mirror 12, where it is directed through secondary focusing lens 15, through optical filter 17 and onto the position sensitive detector 16 at location 20a. The optical filter 17 ensures that light from any other source, such as laser 4, is rejected. When the beam hits the position sensitive detector 16 at location 20a, then the feedback control loop 7 recognizes that the primary optical system is focused and commands the output stage positioner 6 to stay at its current position.

Assume now, that the material 3 is moved to position 3b. The read/write laser 4 shines through the optical system and the optical output stage 1a, but when it reaches the new read/write surface 3b, it is no longer in focus. The secondary laser source 13 shines through the collimating lens 14, reflects off of the first mirror 11, off of the read/write surface 3b at point 18b and then off of the second mirror 12, where it is directed through secondary focusing lens 15, through optical filter 17 and onto the position sensitive detector 16 at location 20b. The difference in the positions of the reflected beam when focused 20a and when out of focus 20b is sensed by the position sensitive detector 16 and read in by the feedback loop 7, which sends a corresponding control signal to the output stage positioner 6. The signal sent by the control loop 7 is operative to move the optical elements mounted on assembly 19 from position 19a to position 19b. When the optical output assembly reaches position 19b, the primary optical system is focused again and the reflected beam measured by the position sensitive detector 16 returns to position 20a. In order to return the beam to the steady-state position 20a, the optical assembly 19 has to move exactly the same amount as material 3 has moved.

The secondary laser 13 is not used for reading or writing, so it can be constantly operational for focusing the primary optical system. Further segregation of the autofocusing system from the primary optical system is provided by the optical filter 17, which blocks the main laser 4. Since the entire autofocusing system is optically independent and optically isolated from the primary system optics, it is not blinded by high power beams used for marking material 3.

Since the mirrors 11 and 12 are attached to the same assembly 19 as the lens 1, the autofocusing system is physically linked to the primary optical system. This physical proximity ensures that the distance measured by the position sensitive detector 16 is indeed representative of the focus of the primary optical system, shown schematically as lens 1, thereby eliminating the possibility for steady state error, which is inherent in the prior art external distance sensor autofocus systems.

It will be obvious to one skilled in the art that numerous substitutions may be made for the optical elements indicated in the above description. The mirrors 11 and 12 and lens 15 can be replaced by any optical element capable of diffraction, reflection or refraction. The output stage positioner 6 can be a moving coil, moving iron, moving magnet, piezoelectric or magnetostrictive actuator. The control loop 7 may be an analog controller or it may be a DSP microcontroller. The primary optical system can be refractive, as shown by lens 1, reflective, diffractive, or any combination of these.

EXAMPLE

A prototype autofocusing system was prepared using a Toshiba (Japan) 10 mW, 670 nm visible light laser diode as the secondary laser source 13. The lens positioner 6 was a loudspeaker voice-coil type of actuator. The position sensitive detector 16 was from United Detector Technology (U.S.A.). The apparatus performed well and the test unit was able to maintain a desired separation distance between the lens 1 and material 3 within 1 micron over a range of 1 mm.

What is claimed is:

1. An apparatus for maintaining a desired separation distance between an object and an optical output stage of a primary optical system, said apparatus comprising:
    (a) a laser source operative to generate an incident laser beam;
    (b) a pair of optical elements rigidly attached to said optical output stage on either side thereof,
    a first of said pair of optical elements operative to deflect said incident laser beam towards said object,
    said object reflecting the incident beam, creating a reflected beam traveling back towards said optical output stage,
    a second of said pair of optical elements operative to deflect said reflected beam;
    (c) a position sensitive detector operative to receive said reflected beam on an input surface thereof and to provide an output signal representative of a location of the reflected beam on said input surface,
    said location of the reflected beam on said input surface being representative of an actual separation between said object and the optical output stage of said primary optical system;
    (d) a control loop operative to interpret the output signal produced by said position sensitive detector and output a corresponding control signal;
    said control signal being calculated in such a way so as to zero a difference between the desired separation and the actual separation, as measured by the position sensitive detector, of said object and said optical output stage; and
    (e) an output stage positioner operative to receive the control signal from said control loop and to move said optical output stage in proportion to said control signal so as to maintain the desired separation between said object and said optical output stage.

2. An apparatus according to claim 1, wherein an additional optical element is used to focus said reflected beam onto said position sensitive detector.

3. An apparatus according to claim 2, wherein said additional optical element is selected from a group including: reflective elements, diffractive elements and refractive elements.

4. An apparatus according to claim 1, wherein said pair of optical elements is selected from a group including:
    reflective elements, diffractive elements and refractive elements.

5. An apparatus according to claim 1, wherein said pair of optical elements is a pair of mirrors.

6. An apparatus according to claim 1, wherein a collimating lens is disposed in a path of said incident laser beam between said laser source and the first of said pair of optical elements.

7. An apparatus according to claim 1, which further comprises an optical filter disposed in a path of said reflected beam,
    said optical filter operative to attenuate light of a wavelength other than that of said reflected beam,
    said optical filter particularly rejecting any light originating from said primary optical system.

8. An apparatus according to claim 1, wherein said control loop includes a digital signal processing (DSP) microcontroller.

9. An apparatus according to claim 1, wherein said output stage positioner is selected from a group including: a moving coil actuator, a moving iron actuator, a moving magnet actuator, a piezoelectric actuator and a magnetostrictive actuator.

10. A method for maintaining a desired separation distance between an object and an optical output stage of a primary optical system, said method comprising the steps of:
    (a) generating an incident laser beam from a laser source;
    (b) deflecting said incident beam with a first optical element, which is rigidly attached to said optical output stage,
    said incident beam then proceeding to impinge on said object and reflect off of it becoming a reflected beam;
    (c) deflecting said reflected beam with a second optical element, which is rigidly attached to said optical output stage;
    (d) measuring a location of said reflected beam when it impinges on an input surface of a position sensitive detector,
    said location of the reflected beam on said input surface being representative of an actual separation between said object and the optical output stage of said primary optical system;
    (e) calculating a feedback signal based on:
        (i) the actual separation between said object and the optical output stage of said primary optical system as determined in said measuring step, and
        (ii) the desired separation between said object and the optical output stage of said primary optical system,
    said feedback signal being calculated in such a way as to zero a difference between the desired separation and the actual separation of said object and said optical output stage; and (f) using said feedback signal to control an output stage positioner, said output stage positioner moving said optical output stage in proportion to said feedback signal, so as to maintain the desired separation between said object and said optical output stage.

11. A method according to claim 10, wherein said deflecting steps are accomplished with optical elements chosen from a group including: reflective elements, diffractive elements and refractive elements.

12. A method according to claim 10, wherein said deflecting steps are accomplished with mirrors.

13. A method according to claim 10, which further comprises the step of:

focusing said reflected beam onto the input surface of said position sensitive detector, said focusing step occurring between said second deflecting step (c) and said measuring step (d), said focusing step narrowing the spot size of said reflected beam on the input surface of said position sensitive detector so as to improve accuracy of said measuring step.

14. A method according to claim 13, wherein said focusing step is accomplished by an additional optical element chosen from a group including: reflective elements, diffractive elements and refractive elements.

15. A method according to claim 10, which further comprises the step of:

collimating said incident laser beam before it is deflected, said collimating step occurring between said generating step (a) and said first deflecting step (b).

16. A method according to claim 10, which further comprises the step of:

filtering said reflected beam, said filtering step operative to attenuate light of a wavelength other than that of said reflected beam, said filtering step particularly rejecting any light originating from said primary optical system.

17. A method according to claim 10, wherein said calculating step is accomplished by a digital signal processing (DSP) micro-controller.

18. A method according to claim 10, wherein said output stage positioner is selected from a group including: a moving coil actuator, a moving iron actuator, a moving magnet actuator, a piezoelectric actuator and a magnetostrictive actuator.

* * * * *